United States Patent [19]

Cornish

[11] Patent Number: 5,580,942

[45] Date of Patent: Dec. 3, 1996

[54] HYPOALLERGENIC NATURAL RUBBER PRODUCTS FROM PARTHENUM ARGENTATUM (GRAY) AND OTHER NON-HEVEA BRASILIENSIS SPECIES

[75] Inventor: Katrinia Cornish, Pinole, Calif.

[73] Assignee: The United States of America, as represented by the Secretary of Agriculture, Washington, D.C.

[21] Appl. No.: 145,546

[22] Filed: Nov. 4, 1993

[51] Int. Cl.$^6$ ................................................ C08G 83/00
[52] U.S. Cl. .......................... 528/1; 521/42; 521/43.5; 528/497; 528/499; 528/933
[58] Field of Search .................. 521/42, 43.5; 528/497, 528/499, 933, 1

[56] References Cited

U.S. PATENT DOCUMENTS

| | | | |
|---|---|---|---|
| 1,918,671 | 7/1933 | Spence | 528/499 |
| 2,459,369 | 1/1949 | Tint et al. | 528/493 |
| 2,618,670 | 11/1952 | Clark | 528/933 |
| 2,665,317 | 1/1954 | Clark et al. | 528/933 |
| 4,136,131 | 1/1979 | Buchanan | 260/816 G |
| 4,435,337 | 3/1984 | Kay et al. | 528/933 |

OTHER PUBLICATIONS

Tomazic et al., *Clinical Immunology and Immunopathology*, vol. 64, (2), pp. 89–97, (1992).

Maso et al., *Journal of the American Academy of Dermatology*, vol. 23, pp. 733–737, (1990).

Slater et al., *Annals of Allergy*, vol. 68(3), pp. 203–211 (1992).

Siler et al., "Potential for Allergy Amelioration by Rubber Particle Purification from Hevea brasiliensis atex, and for Allergy Circumvention by Use of Alternate Rubber Producing Plants"(1993).

Backhause et al., *Phytochemistry*, vol. 30(8), pp. 2493–2497, (1991).

Cornish, Katrina, *ACS Symposium Series No. 497*, (1992).

Cornish et al., *Pytochemistry*, vol. 29(12), pp. 3809–3813, (1990).

*Primary Examiner*—Morton Foelak
*Attorney, Agent, or Firm*—M. Howard Silverstein; John Fado; Janelle S. Graeter

[57] ABSTRACT

Hypoallergenic products are made from *Parthenum argentatum* (Gray), *Ficus elastica* and other non-hevea rubber-containing plants by homogenizing the plants in an aqueous medium, filtering the homogenate and separating the rubber-containing phase from the aqueous phase by centrifugation. Optionally, the filtrate may be clarified before separation. The hypoallergenic rubber products do not contain the rubber-associated proteins which are responsible for sensitization in allergic individuals.

10 Claims, 2 Drawing Sheets

HYPOALLERGENIC NATURAL RUBBER PRODUCTS FROM PARTHENUM ARGENTATUM (GRAY) AND OTHER NON-HEVEA BRASILIENSIS SPECIES

BACKGROUND OF THE INVENTION

1. Field of the Invention

Natural rubber is a raw material vital to our commercial and defense needs, and many consumer products are made with natural rubber obtained from *Hevea brasiliensis* (Hevea) species. The high-performance characteristics of natural rubber cannot be simulated by any other known material. These characteristics include high elasticity, resilience and low heat build-up.

Any of these products, however, can cause severe allergic reactions in hypersensitive individuals. The occurrence of "rubber allergy" first appeared in-the late 1980's and is now widespread; more than half a million Americans may be affected. Health care professionals who routinely wear rubber gloves and patients who undergo multiple surgeries, such as children with spina bifida, are particularly susceptible to sensitization. As no equivalent non-rubber replacement materials are currently available, there is a need to provide alternative sources for the manufacture of rubber products which are non-allergenic. This invention relates to the preparation of non-allergenic rubber products from alternative sources of rubber which do not cause allergic reactions due to "rubber allergy".

2. Description of the Prior Art

Allergic reactions to Hevea rubber products can be severe, and are caused by proteins present in the rubber-containing latex. Review articles have been published addressing the issue of allergic reactions to natural rubber by both health care workers and patients as a result of an increase in the use of disposable latex gloves and other rubber medical devices (Maso and Goldberg, *Journal of the American Academy of Dermatology*, v. 23, pp. 733–737, 1990; Slater, J. E., *Annals of Allergy*, v. 68(3), pp. 203–209, March, 1992; Tomazic et al., *Clinical Immunology and Immunopathology*, v. 64(2), pp. 89–97, August, 1992). Allergic reactions range from an itchy, burning rash to anaphylactic shock. In addition, conditions such as dermatitis, pruritus, urticaria and swelling of the hands, edema of the arms, trunk, face and/or eyelids, laryngeal edema and eyelid dermatitis in the absence of hand eczema may appear. The occurrence of rhinitis, conjunctivitis, coughing, sneezing, asthma, dyspnea, palpitations and dizziness have also been reported. Although exposure to latex gloves is considered responsible for the most of the reported allergic reactions, other rubber medical products, such as catheters, dental devices, condoms, anesthesia masks and barium enema kits, and non-medical products, such as balloons and children's toys, are also implicated in inducing hypersensitivity reactions.

Proteins associated with natural rubber are generally accepted as the primary cause of latex sensitivity, and protein content may vary according to source, lot and manufacturing process. Both type I (immediate, IgE mediated) and type IV (delayed) immune responses have been reported, prompting the FDA to issue a medical bulletin as well as a medical alert regarding possible severe systemic reactions to latex-containing medical devices. To date, the avoidance of use by high risk patients and changes in the manufacturing process are the major approaches to the management of rubber hypersensitivity. The only alternative materials suggested are synthetic materials such as polyurethane and polyvinyl chloride. These materials also carry risks of inducing sensitivity, however, and do not have the high-performance characteristics which make natural rubber products so attractive. As yet, no natural alternative source has been discovered which provides the necessary safety factors for these products which are so widely utilized. Therefore, the search for an effective alternative has continued.

SUMMARY OF THE INVENTION

I have discovered that rubber with little or no allergenic properties may be obtained from plant sources other than Hevea. Rubber extracted from the *Parthenium argentatum* (*P. argentatum*, or guayule) plant, for example, has a protein profile which is different from that of latex obtained from Hevea and other sources.

In accordance with this discovery, it is an object of the invention to provide a method of making hypoallergenic rubber utilizing latex obtained from such alternative sources.

It is also an object of the invention to provide a hypoallergenic rubber product made according to the novel method.

Other objects and advantages of the invention will become readily apparent from the following description.

DETAILED DESCRIPTION OF THE INVENTION

Figure 1A:
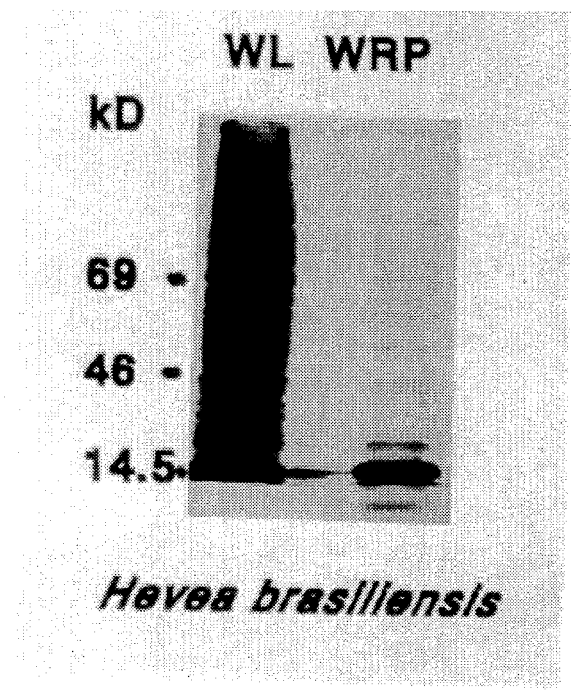
FIG. 1A is a photograph showing results of silver-stained SDS-PAGE protein analysis of *Hevea brasiliensis* whole latex (WL) and washed rubber particles (WRP).

Rubber is a naturally-occurring hydrocarbon polymer of cis-1,4-isoprene with 400–50,000 isoprene monomeric units enzymatically linked in a head-to-tail configuration. A large number of plant species contain rubber, including *Hevea brasiliensis*, *Parthenium argentatum* (guayule), *Euphorbia tirucalli*, *Taraxacum Kok-saghyz, khrim-saghyz,* et al. (dandelions), *Cryosothamnus nauseousus* (rabbit-brush), *Asclepias incarnata, sublata, syriaca,* et al. (milkweeks), *Solidago altissima, graminifolia, leavenworthii, rigida,* et al. (goldenrods), *Cryptostegia grandiflora* (rubbervine), *Sonchus arvensis, oleraceous,* et al. (sow thistles), *Cacalia atriplicifolia* and *Ficus elastica* as well as Silphium spp. (rosin weeds and Pycnanthemum spp. (mountain mints). The proteins present in guayule, *Ficus elastica* (*F. elastica*) and other rubber-producing species were found to be different from those in Hevea latex, indicating that their rubber may not cause the allergic response found in Hevea-sensitive individuals.

Preliminary experiments were carried out to determine the relatedness of the protein profiles among various rubber-containing plant species. Three dissimilar species were selected for testing, and it was shown that there is little immunogenic relationship between natural rubber from Hevea and that either from guayule or from natural rubber latex and/or particles of *F. elastica*. In addition, preliminary clinical trials have provided evidence that natural rubber from guayule and *F. elastica* do not cause allergic reactions in hypersensitive humans. Since two dissimilar non-Hevea species are sources of hypoallergenic rubber, it is expected that all rubber-producing species not closely related to Hevea (i.e., not in the Hevea genus) contain hypoallergenic natural rubber useful as alternative sources for the manufacture of hypoallergenic rubber products.

Natural rubber (cis-1,4-polyisoprene) is formed as a branch of the isoprenoid pathway in plants and some fungi. Proteins occur naturally in the raw latex of rubber-producing plants and include the rubber transferase enzyme (RuT) which is required for adding isopentenyl pyrophosphate units to the polyisoprene chain to provide a high molecular weight polymer of cis-polyisoprene (in Hevea the average molecular weight is about 1,500,000 Da). The amount of protein from raw latex incorporated into the solid rubber, including RuT, depends upon the treatment process during and subsequent to harvesting of the latex. The RuT system appears to be highly conserved among species of plants which make rubber, but most of the other proteins normally incorporated into solid latex rubber differ among species in their immunological properties. Thus, the invention is to use latex from other species to make latex products for use by individuals who have become sensitized to Hevea proteins.

Hevea, as the only current commercial source of natural rubber, is the source of the human rubber allergens, which are the proteins originating from the latex starting material. Hevea latex is a complex and complete cytoplasm, producing rubber in discrete particles and containing numerous proteins. Some of the latex proteins are soluble, some are associated with organelles, and some are bound to the rubber particles. The most serious allergens in a natural rubber product could originate from any or all of these protein groups. Moreover, the quantity of potential allergens in a final product can be greatly affected by the degree of latex purification, i.e. the more protein allergens present, the higher the degree of potential sensitization and/or allergic reaction.

In one approach to reducing the hyperallergenic property of Hevea rubber products, purification of rubber particles from Hevea latex was carried out to test the hypothesis that it may be possible to ameliorate rubber allergies. SDS-PAGE protein analysis (FIG. 1A) showed that most of the latex proteins were not associated with the rubber particles. It may therefore be possible to define the original-location, in the latex, of identifiable human rubber allergens. Latex proteins not associated with the rubber particles may then be readily eliminated through purification, and detergent or protease treatments may be used to remove bound allergens from the rubber particles before processing. While this approach may be adequate for protecting the non-allergic population and would be expected to prevent the widespread sensitization which has recently occurred, it provides little advantage for those hypersensitive individuals who now suffer from rubber allergy.

In a second approach, the wide distribution of rubber biosynthesis in the plant kingdom was exploited to investigate the possibility of providing an alternative source of less allergenic rubber. Over 2,000 species of plants make and accumulate natural rubber, although few do so in commercial yields or grades. These species may contain different proteins from Hevea and perhaps provide such an alternative source.

Figure 1B:
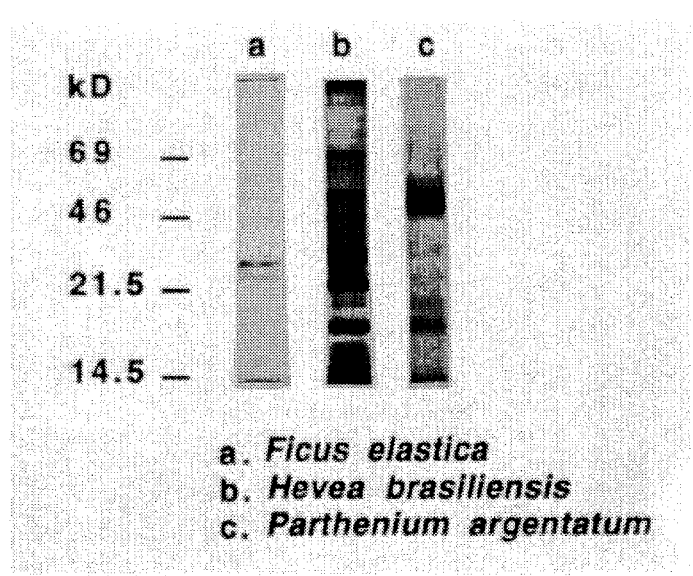
FIG. 1B is a photograph showing results of silver-stained SDS-PAGE analysis of rubber-associated proteins from three different species: (a) *Ficus elastica*, (b) *Hevea brasiliensis*, and (c) *Parthenium argentatum* (guayule). The same amount of rubber particles were extracted from each species.

The three dissimilar and unrelated species, Hevea, F. elastica and guayule were examined, and it was found that the three species possessed remarkably similar rubber production systems. All three species made rubber in rubber particles which appeared to be coated with protein. RuT, the enzyme required for catalyzing the polymerization of natural rubber, was found to be bound to the rubber particles in all three species. Detailed kinetic analysis of rubber biosynthesis demonstrated that the biochemical process of rubber formation was indistinguishable in the three species. These results suggested that the enzymes and structural proteins required for successful rubber biosynthesis are similar. Nevertheless, the rubber particle protein complements of the three species were distinct (FIG. 1B). F. elastica and guayule rubber particles contain very few proteins in comparison with Hevea rubber particles. Since all three species make rubber utilizing RuT and, since RuT is present in all three species, it follows that most of the proteins on Hevea rubber particles are probably not essential to rubber formation.

For further comparison, immunological studies were carried out. Polyclonal antibodies were raised in mice against purified F. elastica rubber particle-bound protein complex, which contains most of the protein associated with the F. elastica rubber particles. Western analysis showed that affinity-purified IgG reacted only very weakly with the rubber particle proteins of Hevea and guayule. This indicates a lack of common epitopes between the rubber particle proteins of F. elastica and those of Hevea and guayule.

In more sensitive biochemical experiments, a subset of highly specific immunogenic commonalities was detected among all three species. Affinity-purified IgG, raised against the F. elastica rubber particle protein complex, specifically inhibited the activity of rubber transferase in both Hevea and guayule.

Thus, it was demonstrated that there is little immunogenic relationship overall among the rubber particle proteins of three diverse rubber-producing plant species. Immunogenic commonalities appear to exist only between those proteins essential for rubber biosynthesis. Since all indications are that the serious allergens present in Hevea latex are uninvolved in rubber biosynthesis, the production of less allergenic rubber using alternative rubber-producing crop species becomes very attractive.

Clinical tests were conducted by collaborators at Scripps Institute, LaJolla, Calif., utilizing the plant materials described for testing Hevea sensitive patients. A preliminary trial tested three individuals, none of whom showed any response to guayule washed rubber particles or to F. elastica whole latex or washed rubber particles.

A second study was conducted at the Rhode Island Hospital in Providence, R.I., and involved 59 people who had undergone multiple surgeries of various sorts and had developed latex allergy. The allergy in these 59 was confirmed to be of the type I, IgE-mediated type by RAST assays. The IgE-mediated allergy is the serious form that can lead to life-threatening anaphylaxis. Skin tests demonstrated that, although all 59 patients were sensitive to Hevea latex, none of the patients showed any allergic response to either guayule or to F. elastica rubber particles.

There are thus 62 confirmed patients who are allergic to Hevea latex proteins but not to those of the other two species. No exceptions have been discovered to date. In addition, purified Hevea latex has been tested on a number of sensitized individuals, and it has been observed that those patients having severe allergic reactions to Hevea latex products continue to react even upon contact with a highly purified product.

The preparation of rubber latex from a particular plant source depends upon the form in which it is present in the plant. Some plants, such as H. brasiliensis, F. elastica and C. grandiflora, contain rubber in a latex form, permitting tapping of the latex. Others, such as guayule, accumulate rubber within the plant cells, thus requiring a special extraction procedure as well as tailored processing in order to produce a rubber-containing latex. Although, theoretically, it is possible to process the latex-containing plants in the same manner as that conventionally followed for the production of Hevea rubber, at present, it is not economically feasible. Therefore, it is recommended that these plants be processed according to the procedure described herein.

Rubber-containing plants, in particular guayule, must not be frozen or allowed to dry below a loss of about 10% fresh weight if its rubber is to be successfully extracted in the form of an artificially-produced latex. Baling harvested guayule with plastic wrap to prevent dessication is advisable if the shrub is not to be quickly transported to a processing plant. In dried or frozen plants, the rubber has, in effect, coagulated inside the cells, necessitating solvent extraction. Although solvent extraction is possible for the production of bulk guayule rubber for tire manufacture, solvent-extracted rubber cannot be used to manufacture latex-dipped products, such as gloves and condoms.

Plant species containing cellular rubber may be utilized by chopping up the rubber-containing part of the plant, followed by homogenization, preferably twice. A wet extraction is essential, and the homogenization process may be carried out in water at ambient temperature. Raising the pH to about 8 with an acceptable buffer (for example, with ammonium hydroxide) may also be helpful for the prevention of coagulation by maintaining the surface charge of the rubber particles. Other ingredients may additionally be included for various purposes. Tris buffer, an antioxidant, such as ascorbate or benzoate and a compound which will bind phenolic compounds and resins, such as polyvinyl polypyrrolidone (PVPP) are also considered useful in the homogenization and extraction process. An effective composition comprises Tris-HCl, about 100 mM and pH about 7.5; potassium fluoride (KF), about 50 mM; ascorbic acid, about 1%; $MgSO_4$, about 5 mM; 2-mercaptoethanol, about 5 mM; phenylmethylsulphonyl fluoride (PMSF), about 0.1 mM; and PVPP (Sigma Chemical Co., St. Louis, Mo.).

The homogenate is filtered, optionally followed by clarification, and separation in the cold. Filtration may be carried out through cheesecloth (about 8 layers), or through screens of decreasing mesh size. Those solids which are filtered out may be fed back through the wet-grinding step. If the filtration step is sufficiently effective, the homogenate may be subjected to a separation step at this point. Alternatively, a clarification step is carried out to remove finely ground solids in the homogenate which will clog the liquid phase separator.

Clarification is achieved by centrifuging filtered homogenate at full speed (about 12,000 rpm) in a Westphalia laboratory centrifuge (Model KA 05-00-105, Centrico, Inc., Foster City, Calif.). Raising the pH of the filtered homogenate at this step will significantly decrease coagulation losses during the clarification process. A range of efflux rates are acceptable and may readily be determined by one of skill in the art. An efflux rate of about 0.75 l/min has been found to be effective.

For the separation step, a wide range of centrifuge speeds are acceptable, from about 300×g to about 5000×g. The extent of coagulation may vary from one batch to another or depending on the time of year. If coagulation is a problem, spin-speeds and/or spin-times may be adjusted until an appropriate combination is determined.

Alternatively, a flow-through method may be used where the centrifuge may be fitted with a liquid phase separator, such as a disc bowl with disc stack attachment. The disc bowl attachment has central rising channels, however the upward rising channels of a disc stack attachment gives somewhat better yields of rubber due to the ratio of the two phases. In addition, the regulating screw must be adjusted to almost complete engagement because of the small difference in specific gravity of the two liquid phases (rubber and aqueous phases). The light phase contains the rubber latex. The heavy phase still contains a small amount of rubber and may be recycled through the wet-grind step and/or the clarification/separation steps. The flow rate is also critical in the separation step: if too slow, no rubber latex will be obtained at all; if too fast, large amounts of aqueous phase will contaminate the rubber latex phase. Trial runs should be carried out to determine the optimum rate. A rate of about 1.2 l/min has been found to be effective for the Model KA 05-00-105 centrifuge mentioned above. This particular rate was found to extract most of the rubber with a final rubber concentration of about 16%. Concentrations from 5 to 30% were obtained using different flow rates.

In the non-flow-through method the rubber particles may be washed by scooping the creamy layer of particles from the centrifuge tubes and suspending in ice cold wash buffer. An acceptable wash buffer comprises Tris-HCl, about 100 mM, pH about 7.5; $MgSO_4$, about 5 mM; and dithiothreitol (DTT), about 10 mM. The particles are washed once or twice, followed by centrifugation and resuspension in wash buffer. Each wash utilizes about one-half the amount of wash buffer as in the previous step. After the last wash, the rubber particles may be stored on ice in the wash buffer. Alternatively, in the flow-through method, the latex may be washed by diluting in water or dilute ammonium hydroxide (about 2%, w/v) and reseparating the heavy phase. This procedure may be repeated, as required, to obtain latex of desired purity.

The latex is ammoniated and then centrifuged to concentrate it. No coagulation problems have been observed at spins up to 2500×g, however, faster spins may be utilized as determined by trial runs. Standard concentrators are conventional in the rubber industry, and those used for concentrating Hevea rubber are effective for use in this procedure also.

The prepared rubber product may then be compounded according to its ultimate use and then utilized for the manufacture of any product which has previously been manufactured with Hevea rubber. Medical devices and toys are particularly important products since they are widespread in their use and contact with them often leads to hypersensitivity and allergic reactions. In addition, the novel hypoallergenic rubber is contemplated as useful for the manufacture of other items made of rubber, such as rubber bands, elastic, rubber gloves, some cooking utensils, clothing, sports equipment, carpet pads, and so forth. The methods for the manufacture of such products are conventional and well-known in the art and effectively utilize the novel hypoallergenic rubber product as easily as rubber derived from Hevea.

Since there is such a wide variety of rubber-producing plants, in order to ensure that one is utilizing a hypoallergenic source, an immunological test may be performed in order to confirm whether or not the Hevea-like proteins causing hypersensitivity are present in a particular plant. As described in a previous section, polyclonal antibodies which are reactive with the Hevea proteins may be raised by injecting an animal (e.g. a mouse) with a latex suspension from Hevea. These antibodies may be utilized to determine if there is any cross-reactivity between rubber or latex obtained from the plant of interest and those of Hevea. A lack of cross-reactivity clearly indicates that any proteins present in the plant would not induce an allergic reaction and thus would be safe for use in the production of hypoallergenic rubber particles. An ELISA kit for this purpose has also been utilized and found effective for the detection of immunogenic proteins in latex products (Guthrie LEAPc Assay, Guthrie Research Institure, Sayre Pa.).

The following example is intended only to further illustrate the invention and is not intended to limit the scope of the invention which is defined by the claims.

EXAMPLES

Example 1

Isolation of Rubber Latex from Guayule (Method 1)

Seventy grams of guayule bark peeled from green stems (greater than 0.5 cm in diameter), were homogenized for one min in 350 ml of ice cold extraction buffer containing 100 mM Tris-HCl at pH 7.5, 50 mM KF, 1% ascorbic acid, 5 mM MgSO4, 5 mM 2-mercaptoethanol, 0.1 mM PMSF, 17.5 ul Antifoam A, and 30 g PVPP. The homogenate was filtered through 8 layers of cheesecloth, distributed between eight 50-ml centrifuge tubes, and centrifuged in a swinging bucket rotor at 4,000×g at 4 C for 8 min. The creamy layer of rubber particles was scooped from the centrifuge tubes with a spatula (shallow spoon type), suspended in 160 ml ice cold wash buffer containing 100 mM Tris-HCl at pH 7.5, 5 mM MgSO4, and 10 mM DTT, distributed between four 50-ml centrifuge tubes, and centrifuged in a swinging bucket rotor at 2,400×g at 4 C for 8 min. The rubber particles were again scooped from the tubes and were resuspended in 80 ml of ice cold wash buffer. The suspension was distributed between two centrifuge tubes and the last centrifugation step was repeated. The rubber particles were retrieved from the tubes, resuspended in an appropriate volume of ice cold wash buffer, and stored on ice until used. The concentration of rubber particles in the suspension was estimated by hemocytometry.

Example 2

Isolation of Rubber Latex from Guayule (Method 2)

Guayule bark was ground in water (1:2, weight/volume), 1% ascorbate and PVPP (150 g bark+300 ml water+3 g ascorbate+5 g PVPP). The mixture was ground until fine, then filtered through 8 layers of cheesecloth. The solids were reground in 200 ml water with no additives in the second grind, filtered and pooled with the first filtrate. Ammonium hydroxide was added to 2%, and the filtered homogenate was clarified by centrifuging in a Westphalia laboratory centrifuge (Model KA 05-00-105) set up with a clarification attachment at full speed (12,000 rpm), and at ambient temperature and an efflux rate of 0.75 l/min.

The clarified homogenate was then run through the same centrifuge set up with a disc bowl attachment with central rising channels, and the regulating screw adjusted almost completely engaged and a flow rate of about 1.2 l/min. A final rubber concentration of 16% was achieved using this method.

Following the separation step, the rubber was washed by diluting in water and reseparating the heavy phase. After washing, the latex was ammoniated (2%) and centrifuged for concentration at 2500×g. A final rubber concentration of 55% was obtained with no losses detectable.

I claim:

1. A method of producing hypoallergenic rubber products, said method comprising,
   a) homogenizing rubber-containing plants in aqueous medium, wherein said aqueous medium comprises buffer, pH about 7.0 to about 8.0, an antioxidant, and a compound which will bind phenolic compounds and resins;
   b) filtering the homogenate;
   c) separating the rubber-containing phase from the aqueous phase; and
   wherein the rubber-containing plants are non-Hevea plants.

2. The method of claim 1, wherein the antioxidant is ascorbic acid and the compound which will bind phenolic compounds and resins is polyvinyl polypyrrolidone.

3. The method of claim 1, wherein said method additionally comprises clarifying the filtrate after filtering and before separating the rubber-containing phase from the remaining aqueous phase.

4. The method of claims 1 and 3, wherein said filtrate is made alkaline before the clarification and filtration steps.

5. The method of claim 4, wherein said filtrate is made alkaline by ammoniating at about 2% w/v.

6. The method of claim 1, wherein said separating is carried out by centrifugation at about 300×g to about 5000×g.

7. The method of claim 6, wherein said centrifugation is carried out at about 2400×g to about 3000×g.

8. The method of claim 7, wherein said centrifugation is carried out at about 2400×g.

9. The method of claim 1, wherein said non-Hevea plants are *Parthenium argentatum* (Gray) or *Ficus elastica*.

10. The method of claim 9, wherein said non-Hevea plant is *Parthenium argentatum* (Gray).

\* \* \* \* \*